June 21, 1966 J. J. COOMBS 3,256,680
VACUUM CLEANER
Filed April 12, 1963
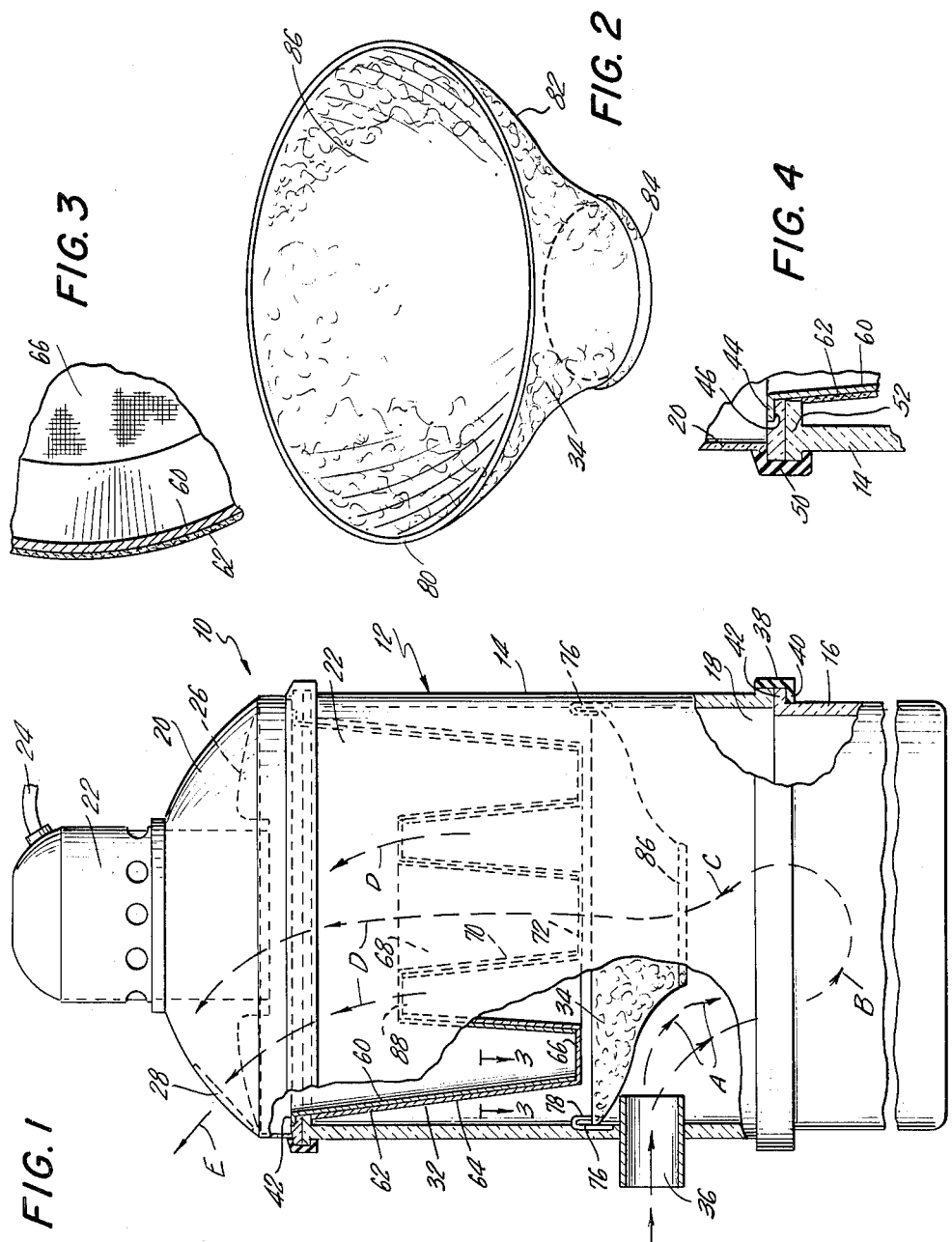
INVENTOR.
JOHN J. COOMBS
BY
ATTORNEYS

United States Patent Office 3,256,680
Patented June 21, 1966

3,256,680
VACUUM CLEANER
John J. Coombs, Cardston, Alberta, Canada
Filed Apr. 12, 1963, Ser. No. 272,685
2 Claims. (Cl. 55—320)

This invention relates to a vacuum cleaner and more particularly to a device of this type which employs centrifugal separation for removal of at least the major portion of dirt, dust, lint and other foreign matter from the intake air.

Various types of tank-type vacuum cleaners have been devised which have employed complex series of baffles and tubes to induce centrifugal separation in a tank-type vacuum cleaner. These complex baffle arrangements have been disadvantageous since the velocity of the intake air is severely reduced because of the vortices and other impediments caused by the baffles. The baffles occupy a considerable amount of space thereby permitting only a reduced area for centrifugal separation and a reduced capacity for the container of foreign matter such as dirt and dust particles and the like. It is therefore an object of the present invention to provide an arrangement of parts wherein there is a baffle of novel fiberglass construction associated with the air intake. The baffle is provided with a particular hyperbolic shape such as to cause the intake air to be fed from the body into the container whereby centrifugal separation of dirt, dust, etc. is accomplished prior to the flow of the air through a novel filter surface area and thence through the exhaust outlet.

It is a further object of the invention to provide a vacuum cleaner which is constructed mainly of fiberglass so as to be light in weight, substantially free from deterioration due to chemical or other adverse influences, while being strong and very light in weight, thereby being more readily portable.

A further object of the present invention resides in the provision of a vacuum cleaner that is provided with a combined basket and filter which is of a shape so as to provide an optimum filter surface area while also providing means for holding and gathering a quantity of dirt, dust, lint and other material which may not be initially separated by centrifugal separation so as to prevent it from passing upwardly toward the motor and fan or out of the exhaust from the vacuum cleaner, yet which is so configurated so as to efficiently permit such material to be gathered and then directed down into the container as soon as the suction induced by the fan has ceased due to the shutting off of the vacuum cleaner.

A yet further object of the present invention resides in the provision of an arrangement of parts in a vacuum cleaner constructed mainly of fiberglass, which includes a baffle formed of fiberglass and arranged so as to induce centrifugal separation and which is so arranged that the opening through which relatively particle-free air can pass upwardly through the filter which has an optimum filtering surface area so arranged as to substantially free itself of foreign matter when the vacuum cleaner is shut off, whereby very little impedance is provided to the proper flow of air for both centrifugal separation and filter separation so that the vacuum cleaner will operate with remarkable efficiency.

In accordance with an illustrative and particularly desirable embodiment of the invention, there is provided a vacuum cleaner which has a tubular fiberglass body which is open at both ends thereof. A turbine and motor housing is detachably secured to the upper end of the housing, with the motor and turbine being located in the housing for inducing suction through the body. The housing has an exhaust outlet between the turbine and the motor. An air intake is connected to the body in close proximity to a baffle formed of fiberglass. The baffle is detachably secured by suitable clips to the fiberglass body. The baffle is of a dish shape and has a portion in the shape of a hyperboloid of revolution for deflecting dirt containing intake air into the container for centrifugal separation before passing through the central opening in the baffle and through the filter and out of the exhaust outlet. The filter is of a particular shape so as to provide an optimum filtering surface area and is so arranged as to have a recess defining a truncated conical projection which terminates flush with the closed end of the filter. The recess provides means for gathering and holding therein a suitable quantity of foreign matter so that the foreign matter is collected in a manner so as to achieve sufficient weight to cause the matter to break free of the filter and fall onto the baffle plate and thence be directed through the central opening, or to fall directly through the central opening.

Still further objects and features of this invention reside in the provision of a vacuum cleaner that is simple in construction, efficient in operation, relatively inexpensive to manufacture out of readily available materials, and which is light in weight so as to be readily portable and easy for the housewife, or other cleaning person to operate, move and carry.

These, together with the various ancillary objects and features of the invention, which will become apparent as the following description proceeds, are attained by this vacuum cleaner, an illustrative embodiment being shown in the accompanying drawing, by way of example only, wherein:

FIG. 1 is an elevational view of the vacuum cleaner with parts being broken away to show the details of construction of the baffle and filter;

FIG. 2 is an enlarged perspective view of the baffle forming one of the important elements of this invention;

FIG. 3 is an enlarged sectional detail view taken along the plane of line 3—3 in FIG. 1; and FIG. 4 is an enlarged section detail view illustrating the connecting arrangement used for holding the body and the motor and turbine housing together.

With continuing reference to the accompanying drawings wherein like reference numerals designate similar parts throughout the various views, reference numeral 10 is used to generally designate the vacuum cleaner comprising the present invention. The vacuum cleaner 10 includes an outer shell 12, having three main portions including a fiberglass body 14 of generally tubular shape, a dirt container 16, secured to the lower open end 18 of the body 14, and a turbine and motor housing 20 secured to the open upper end of the body 14. An electric motor 22 connected through a suitable conductor 24 to a source of electrical power is provided in the housing 20 and drives a turbine or fan 26 in a manner so as to induce suction and direct air through an exhaust outlet 28 formed in the housing, 20.

Within the body 14 there are provided two other important elements of the invention. One of these is a combined basket and filter 32 and there is also provided a fiberglass baffle 34. Below the fiberglass baffle 34, there is disposed an air intake conduit 36. The air intake conduit 36 penetrates the cylindrical walls of the body 14 at a point immediately adjacent to but below the baffle 34.

The container 16 is detachably secured to the body 14 by means of a gasket 38 formed of rubber or like synthetic material so arranged that the gasket 38 may be, for example, bonded to the body 14 and provided with a flange 40 which is adapted to engage the flange 42 on the container 16 so as to lockingly hold the container 16 in place in an air-tight manner while permitting ready disengagement thereof when it is desired to empty the container.

The combined basket and filter 32 is provided with a lip 34 for engagement within a recess 46, see FIG. 4, formed in a flange 48 extending around the periphery of the housing 20. A rubber gasket 50 is so arranged as to lockingly hold the body 14 and the housing 20 together and the gasket may be entirely separable from the body 14 and the housing 20 or may be bonded to one or the other of these two parts and detachably secured to the other of the parts for holding the parts in the assembled relationship with the flange 48 engaging the flange 52 of the body 14.

The combined filter and basket 32 is formed of a wire basket 60 and a woven filter 62 formed of cloth or the like which is stretched over the wire basket 60. The basket 60 has an outer truncated conical configuration 64 which terminates in a closed end wall 66. The upper end of the filter is open. A recess 68 is formed in the end wall 66 and itself is of a tapered circular shape so as to form a truncated conical projection 70 having an end wall 72, which extends flush with the end wall 66. The end walls 66 and 72 are located immediately adjacent the upper edge portions of the baffle 34.

Suitable clips 76 are spaced around the periphery of the body 14 and embedded or otherwise secured to the body 14 and provided with clip portions 78 which are adapted to lock over a bead 80 or like edge portion of the baffle 34. The baffle 34 has a portion 82 configurated in a hyperboloid of of revolution and terminates in a tubular portion 84 defining a central opening 86. The baffle 34 is of a thin wall construction and likewise the inner surface is in the form of a hyperboloid of revolution at 86. This baffle 34 is preferably formed of fiberglass which is especially advanageous due to the fact that it will resist deterioration due to chemicals, abrasives, or other deleterious material which is sucked into the vacuum cleaner.

In operation, air will be sucked into the air intake 36 to which there is connected the suitable hoses and appliances of a conventional construction. Air will pass through the intake as indicated by the arrows A and such air will impinge upon the baffle 34 and will be turned downwardly in the direction indicated by arrows at B so that a centrifugal separation will be induced. This cyclonic movement will be in a circuitous path within the container 16 and in the lower portions of the body 14. This will cause much of the foreign matter, dirt, dust, lint, and the like to remain in the container 16. The relatively clean air will then pass in the direction of the arrows C through the central opening 86 and then in the direction of the arrows D through the portions of the combined basket and filter 32 and thence as indicated by arrows E out of the exhaust outlet 28. The remainder of the particles of foreign matter, such as dirt, dust, lint, etc. remaining in this relatively clean air will impinge upon the filter cloth 62 and be trapped and gathered together. Because of the configuration of the recess 60, most of this matter will be gathered at the ring-shaped wall 88. As soon as the motor 22 is shut off, this dirt which has gathered will be of sufficient weight to fail to continue to adhere to the filter material 62 and will fall due to gravity onto the baffle 34. The interior surface of the baffle 34 will direct this material through the opening 86 and into the container 16. Of course, some of the material may fall directly through the opening 86. Because of the construction of the filter, and its connection to the flanges 48 and 52, all of the foreign matter in the partially cleaned air must be trapped by this filter and any of the matter which is of sufficient weight and dimensions to break away from the surface of the filter cloth 62 will be directed by the configuration of the baffle 34 back into the container 16. This is highly desirable since it will insure a long life to the filter basket and the filter cloth and the filter will be substantially self-cleaning.

A latitude of modification, substitution and change is intended in the foregoing disclosure, and in some instances, some features may be employed without a corresponding use of other features. Accordingly, it is appropriate that the appended claims be construed broadly and in a manner consistent with the spirit and scope of the invention.

I claim:

1. A vacuum cleaner comprising a tubular fiberglass body open at both ends thereof, a turbine and motor housing detachably secured to one of said ends, a motor and turbine in said housing for inducing suction through said body, said housing having an exhaust outlet therein between said turbine and said motor, an air intake conduit connected to said body and spaced from said ends, a removable basket and filter detachably secured between said housing and body and extending into said body, an arcuate dish-shaped fiberglass baffle disposed in said body entirely below said filter and between said filter and said intake conduit, said baffle having a central opening therein, a fiberglass container detachably secured to the other of said ends, said baffle having a portion in the shape of a hyperboloid of revolution for deflecting dirt containing intake air into said container for centrifugal separation before passing through said central opening and through said filter and out of said exhaust outlet, said body, said baffle, and said container being formed of fiberglass, clip means arranged peripherally on the interior of said body, engaging means on said baffle, said baffle being resiliently detachably engaged by said clip means for removably securing said baffle in said body, said filter having an open end adjacent said housing and a closed end adjacent said baffle, said filter having an outer truncated conical configuration, said closed end being provided with a circular recess therein and with an inner truncated conical projection extending towards said closed end concentrically disposed with respect to said outer truncated conical cvonfiguration to define an optimum filter surface area while trapping solid material not completely removed by centrifugal separation.

2. A vacuum cleaner according to claim 1, wherein said recess and said projection are in alignment with said central opening, the upper surface of said baffle being shaped to direct solid matter falling from said filter through said central opening and to said container.

References Cited by the Examiner

UNITED STATES PATENTS

| 2,323,405 | 7/1943 | Linderoth | 55—413 |
| 2,719,596 | 10/1955 | Kent et al. | 55—413 |
| 2,774,443 | 12/1956 | Slayter. | |
| 2,789,659 | 4/1957 | Heimscheidt | 55—380 |
| 2,816,682 | 12/1957 | Brucker | 220—40 |
| 3,047,994 | 8/1962 | Le Brun | 55—493 |

FOREIGN PATENTS

| 708,415 | 7/1941 | Germany. |

OTHER REFERENCES

Factors in Design of Cyclone Dust Collectors, by Melvin First et al., article in "Heating and Ventilating," July 1948, pages 80–86.

ROBERT F. BURNETT, *Primary Examiner.*

HARRY B. THORNTON, *Examiner.*